United States Patent
Otsubo

(10) Patent No.: US 11,174,990 B2
(45) Date of Patent: Nov. 16, 2021

(54) TANK

(71) Applicant: TOYOTA JIDOSHA KABUSHIKI KAISHA, Toyota (JP)

(72) Inventor: Hirokazu Otsubo, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 212 days.

(21) Appl. No.: 16/227,559

(22) Filed: Dec. 20, 2018

(65) Prior Publication Data
US 2019/0195428 A1 Jun. 27, 2019

(30) Foreign Application Priority Data
Dec. 27, 2017 (JP) .............................. JP2017-250657

(51) Int. Cl.
*F17C 1/02* (2006.01)
*F17C 1/16* (2006.01)

(52) U.S. Cl.
CPC ................. *F17C 1/02* (2013.01); *F17C 1/16* (2013.01); *F17C 2201/0109* (2013.01); *F17C 2201/056* (2013.01); *F17C 2201/058* (2013.01); *F17C 2203/012* (2013.01); *F17C 2203/0604* (2013.01); *F17C 2203/066* (2013.01); *F17C 2203/0619* (2013.01); *F17C 2203/0663* (2013.01); *F17C 2203/0673* (2013.01); *F17C 2205/0305* (2013.01); *F17C 2205/0394* (2013.01); *F17C 2209/2118* (2013.01); *F17C 2209/234* (2013.01); *F17C 2221/012* (2013.01); *F17C 2223/0123* (2013.01); *F17C 2223/036* (2013.01); *F17C 2260/011* (2013.01);

(Continued)

(58) Field of Classification Search
CPC ...... F17C 1/02; F17C 1/16; F17C 2201/0109; F17C 2201/056; F17C 2201/058; F17C 2203/012; F17C 2203/0604; F17C 2203/0619; F17C 2203/0663; B29C 65/02; B29C 66/54; B29C 66/71; B29C 66/7212; B29C 66/72141
USPC .................................................. 220/589, 586
See application file for complete search history.

(56) References Cited

U.S. PATENT DOCUMENTS 5,518,141 A * 5/1996 Newhouse ................ F17C 1/16
 220/586
5,979,692 A * 11/1999 West ........................ F17C 1/16
 220/586

(Continued)

FOREIGN PATENT DOCUMENTS

EP 2 384 408 B1 3/2019
JP 2010-052739 3/2010

(Continued)

*Primary Examiner* — J. Gregory Pickett
*Assistant Examiner* — Niki M Eloshway
(74) *Attorney, Agent, or Firm* — Finnegan, Henderson, Farabow, Garrett & Dunner, LLP

(57) ABSTRACT

A tank comprises: a liner having a cylindrical trunk portion and a hemispherical dome portion provided at both ends of the trunk portion in a central axis direction; a fiber-reinforced resin layer formed on an outer peripheral surface of the liner; and a metallic reinforcement member formed integrally with the liner. The reinforcement member is arranged in the dome portion at least at a shoulder portion near a boundary between the dome portion and the trunk portion and is not arranged at least at part of the trunk portion.

12 Claims, 8 Drawing Sheets

(52) U.S. Cl.
CPC ............... *F17C 2260/037* (2013.01); *F17C 2270/0168* (2013.01); *F17C 2270/0184* (2013.01)

(56) References Cited

U.S. PATENT DOCUMENTS

| | | | |
|---|---|---|---|
| 6,227,402 B1* | 5/2001 | Shimojima | F17C 1/16 |
| | | | 220/581 |
| 2008/0251520 A1* | 10/2008 | Ota | F17C 1/16 |
| | | | 220/586 |
| 2011/0303681 A1* | 12/2011 | Newhouse | B29D 22/003 |
| | | | 220/581 |
| 2012/0291878 A1* | 11/2012 | Pisot | F17C 1/06 |
| | | | 137/315.01 |
| 2013/0087567 A1 | 4/2013 | Kaneko et al. | |
| 2013/0341337 A1* | 12/2013 | Patterson | F17C 1/16 |
| | | | 220/586 |
| 2014/0197179 A1 | 7/2014 | Nakamura et al. | |
| 2016/0076700 A1* | 3/2016 | Uchida | F17C 1/04 |
| | | | 220/586 |
| 2017/0122437 A1* | 5/2017 | Metzbower | F17C 1/16 |
| 2018/0172208 A1* | 6/2018 | Lee | F17C 1/06 |
| 2018/0238496 A1* | 8/2018 | Otsubo | F17C 1/02 |
| 2019/0152312 A1* | 5/2019 | Park | B60K 15/03 |
| 2020/0217455 A1* | 7/2020 | Nozawa | F17C 1/06 |

FOREIGN PATENT DOCUMENTS

| | | |
|---|---|---|
| JP | 2010-270781 A | 12/2010 |
| JP | 2011-163354 | 8/2011 |
| JP | 2013-015175 | 1/2013 |
| JP | 2013-228082 A | 11/2013 |
| WO | WO 2011/154994 | 12/2011 |

* cited by examiner

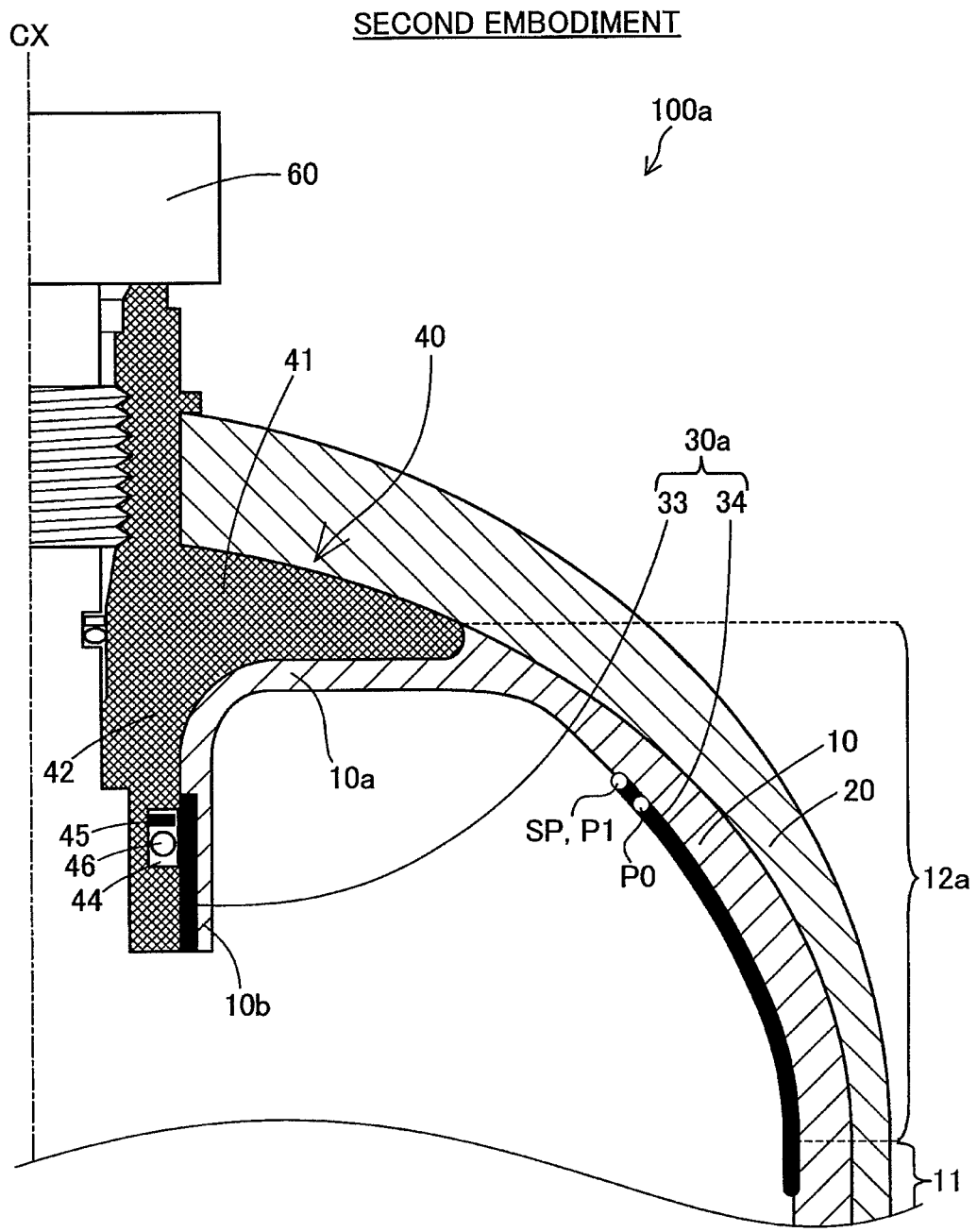

TANK

CROSS REFERENCE TO RELATED APPLICATIONS

This application claims priority to Japanese Patent Application No. 2017-250657 filed on Dec. 27, 2017, the entire contents of which are incorporated by reference herein.

BACKGROUND

Field

The present disclosure relates to a tank.

Related Art

There is a known configuration of a tank for high-pressure fluid that includes a liner as a base material of the tank and a fiber-reinforced resin layer formed on the outer peripheral surface of the liner (refer to WO 2011/154994). The liner is formed from a resin and has a cylindrical trunk portion and hemispherical dome portions provided at the both ends of the trunk portion along the axial direction. The fiber-reinforced resin layer is formed by winding many times reinforced fibers impregnated in advance with a thermosetting resin on the outer periphery of the liner. The fiber-reinforced resin layer is used to enhance the strength of the liner.

In a case where the tank described in WO 2011/154994 is mounted on a vehicle as a fuel gas storage tank for a fuel cell, while the vehicle is continuously driven in an expressway, for example, the fuel gas is continuously supplied from the tank to the fuel cell. At this time, the fuel gas expands adiabatically in the tank to decrease the temperature and pressure in the tank and cause the shrinkage of the tank.

The linear expansion coefficient of the liner is greater than the linear expansion coefficient of the fiber-reinforced resin layer, and thus the liner changes more greatly in dimensions due to the temperature change than the fiber-reinforced resin layer. Resulting from the difference in the amount of dimension change, at the shrinkage of the tank, there may be produced a gap between the liner and the fiber-reinforced resin layer. In general, with increase in the length of an object, the amount of dimension change in the object according to linear expansion coefficient becomes greater. Therefore, the liner shrinks more greatly in the axial direction than in the radial direction. Accordingly, the gap between the liner and the fiber-reinforced resin layer becomes large in particular from the boundaries between the trunk portion and the dome portions to the dome portions.

If a fuel gas is rapidly charged into the tank in such a low-temperature and low-pressure state, the shrunk tank then expands. At this time, the tank expands in the radial direction of the liner and then expands in the axial direction of the liner. Accordingly, the gap from the boundaries between the trunk portion and the dome portions to the dome portions is likely to remain. Due to the remaining gap, the liner is not enhanced in strength from the boundaries to the dome portions even with the fiber-reinforced resin layer, which may cause a problem that the liner is likely to deform. This problem is not limited to a fuel gas tank for a fuel cell but is also shared by other tanks for any kinds of high pressure fluids such as natural gas. Thus, there is a demand for a technique for reducing the amount of a gap between the liner and the fiber-reinforced resin layer.

SUMMARY

According to an aspect of the present disclosure, a tank is provided. This tank comprises: a liner having a cylindrical trunk portion and a hemispherical dome portion provided at both ends of the trunk portion in a central axis direction; a fiber-reinforced resin layer formed on an outer peripheral surface of the liner; and a metallic reinforcement member formed integrally with the liner. The reinforcement member is arranged in the dome portion at least at a shoulder portion near a boundary between the dome portion and the trunk portion and is not arranged at least at part of the trunk portion.

According to the tank in this aspect, the reinforcement member is arranged in the dome portion at least at the shoulder portion near the boundary between the dome portion and the trunk portion, and thus the reinforcement member suppresses the shrinkage of the liner at the shoulder portion even when the tank shrinks. This makes it possible to reduce the amount of a gap between the liner and the fiber-reinforced resin layer as compared to the configuration without the reinforcement member. In addition, the reinforcement member is not arranged at least at part of the trunk portion, which makes it possible to achieve the weight reduction of the tank as compared to the configuration in which the reinforcement member is arranged on the entire trunk portion.

BRIEF DESCRIPTION OF DRAWINGS

FIG. 8 is a cross-sectional view of a schematic configuration of a tank in a second embodiment.

DESCRIPTION OF EMBODIMENTS

A. First Embodiment

Figure 1:
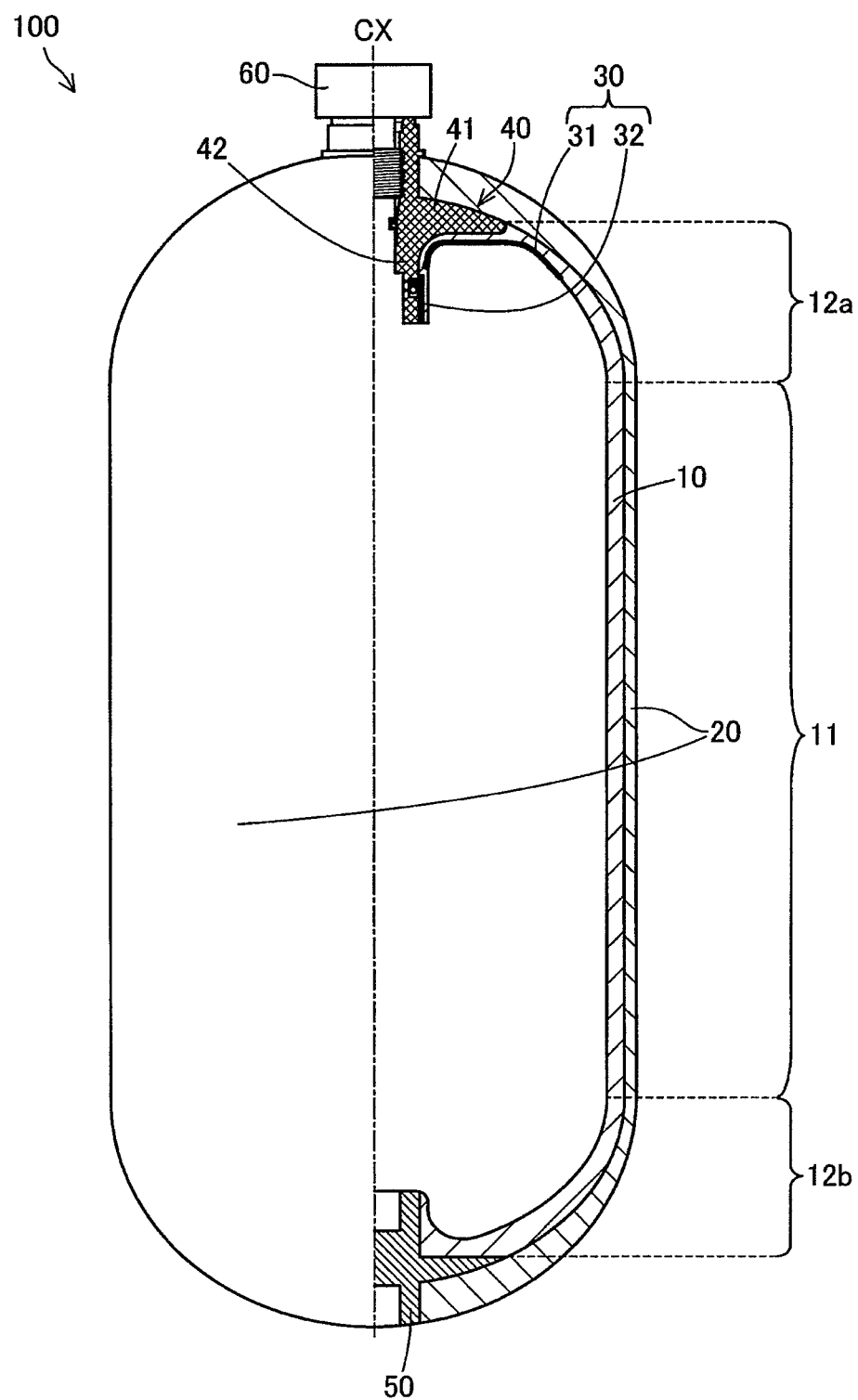
FIG. 1 is a diagram illustrating a schematic configuration of a tank.

A1. Configuration of a Tank:

FIG. 1 is a diagram illustrating a schematic configuration of a tank as an embodiment of the preset disclosure. A tank 100 is configured such that a fiber-reinforced resin layer 20 is formed on the outer peripheral surface of a liner 10 as a base material of the tank 100. The tank 100 is used in a fuel cell system to store hydrogen gas as a fuel gas. The left half of FIG. 1 illustrates the outer appearance of the tank 100, and the right half of FIG. 1 illustrates the cross section of the tank 100 taken along a longitudinal direction.

The tank 100 includes the liner 10, the fiber-reinforced resin layer 20, a collet ring 40, an end boss 50, a valve 60, and a reinforcement member 30.

The liner 10 is a hollow container with high gas-barrier properties. The liner 10 has a trunk portion 11 that is approximately cylindrical in shape and extends in the longitudinal direction, and two hemispherical dome portions 12a and 12b that are provided at both ends of the trunk portion 11 in an axial direction of a central axis of the trunk portion 11. The central axis of the trunk portion 11 matches a central axis CX of the liner 10. In addition, central axes of the dome portions 12a and 12b match the central axis of the trunk portion 11. The "axial direction" is a direction along the central axis of the trunk portion 11. The "radial direction" is a direction orthogonal to the axial direction. The liner 10 is formed from a resin such as polyamide, ethylene-vinylalcohol copolymer, or polyethylene, for example. Instead of a resin, the liner 10 may be formed from a metal such as an aluminum alloy.

The collet ring 40 is installed at the top of one dome portion 12a, and the end boss 50 is installed at the top of the other dome portion 12b. Each of the collet ring 40 and the end boss 50 is formed from aluminum to facilitate heat exchange between the liner 10 and the tank 100.

The collet ring 40 is installed such that a central axis of the collet ring 40 matches the central axis of the trunk portion 11. The collet ring 40 communicates with the inside of the liner 10. A hydrogen-gas supply pipe is connected to the collet ring 40. The liner 10 and the collet ring 40 are press-fitted and joined together. The collet ring 40 has a flange portion 41 and a protrusion portion 42. The flange portion 41 is a flange-shaped portion that extends in the radial direction. The protrusion portion 42 is an approximately cylindrical portion that is connected to the flange portion 41 and protrudes from the dome portion 12a toward the trunk portion 11 in the axial direction of the trunk portion 11.

The end boss 50 is similar in shape to the collet ring 40. Unlike the collet ring 40, the end boss 50 does not communicate the inside of the liner 10 with the outside of the tank 100.

The valve 60 is attached to the opening in the collet ring 40. Opening the valve 60 makes it possible to supply a hydrogen gas into the liner 10 or supply the hydrogen gas stored in the liner 10 to the outside. Closing the valve 60 makes it possible to seal the liner 10. Part of the valve 60 is inserted into the collet ring 40. One end of a flow path in the valve 60 is opened in the liner 10.

The fiber-reinforced resin layer 20 is formed to cover the outer peripheral surface of the liner 10, the outer peripheral side surface of the collet ring 40, and the outer peripheral side surface of the end boss 50. The fiber-reinforced resin layer 20 is resistant to pressure and is used to enhance the strength of the liner 10. The fiber-reinforced resin layer 20 is a carbon fiber-reinforced plastic (CFRP) layer in which carbon fibers impregnated with a thermosetting resin are wound many times and the plurality of layers of fibers are stacked.

In the present embodiment, the carbon fibers are polyacrylonitrile (PAN)-based carbon fibers. Instead of the polyacrylonitrile (PAN)-based carbon fibers, any other carbon fibers such as rayon-based carbon fibers or pitch-based carbon fibers may be used. In addition, glass fibers or aramid fibers may be included for the purpose of reinforcement of the carbon fibers. The thermosetting resin with which the carbon fibers are impregnated is an epoxy resin. Instead of the epoxy resin, any other thermosetting resin such as a polyester resin or a polyamide resin may be used. Instead of the thermosetting resin, the carbon fibers may be impregnated with ultraviolet curing resin.

As illustrated in FIG. 1, the reinforcement member 30 is arranged inside the liner 10. The reinforcement member 30 is used to enhance the strength of the liner 10. The reinforcement member 30 includes a first cover portion 31 and a second cover portion 32. The first cover portion 31 is arranged to cover the inner surface of part of the dome portion 12a. The second cover portion 32 is arranged to cover the outer surface of the protrusion portion 42 of the collet ring 40. As illustrated in FIG. 1, the reinforcement member 30 is not arranged on the trunk portion 11 and the other dome portion 12b. The reinforcement member 30 is formed integrally with the liner 10 and is insert-molded at the time of injection molding of the liner 10. In the present embodiment, the reinforcement member 30 is formed from aluminum. Instead of aluminum, the reinforcement member 30 may be formed from another kind of metal such as stainless steel or titanium. The arrangement position and manufacturing method of the reinforcement member 30 will be described later in detail.

Figure 2:
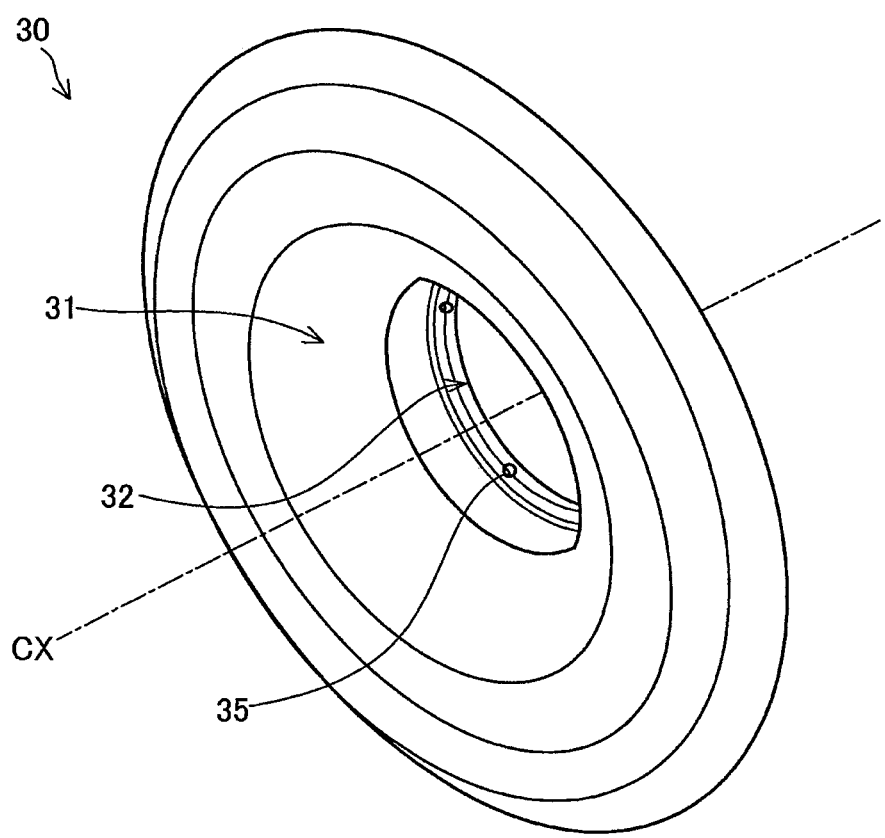
FIG. 2 is an enlarged perspective view of a configuration of a reinforcement member.
Figure 3:
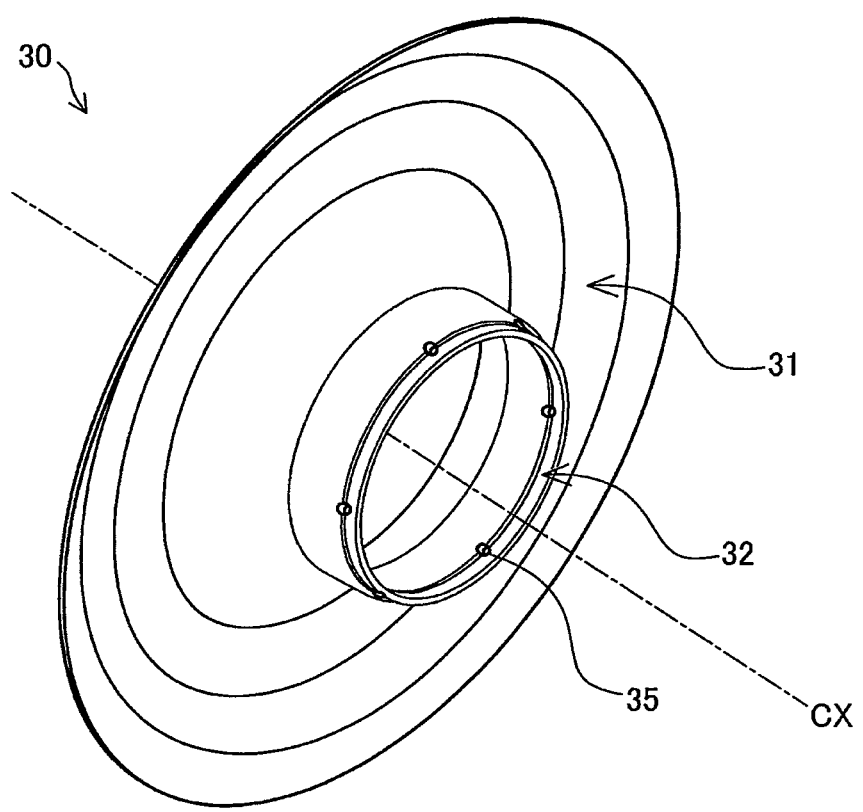
FIG. 3 is an enlarged perspective view of a configuration of the reinforcement member.

A2. Details of Configuration of the Reinforcement Member:

FIGS. 2 and 3 are enlarged perspective views of a configuration of the reinforcement member 30. FIG. 2 illustrates the reinforcement member 30 as seen from the collet ring 40 side. FIG. 3 illustrates the reinforcement member 30 as seen from the internal space of the liner 10. As illustrated in FIGS. 2 and 3, the first cover portion 31 has a portion disc-shaped in outer appearance and a portion approximately cylindrical in outer appearance that protrudes from the center of the disc-shaped portion in a direction toward the internal space of the liner 10. A plurality of through holes 35 are formed on the perimeter of the cylindrical portion. In the portion approximately cylindrical in outer appearance, the second cover portion 32 protrudes toward the internal space of the liner 10 from the positions of the through holes 35.

Figure 4:
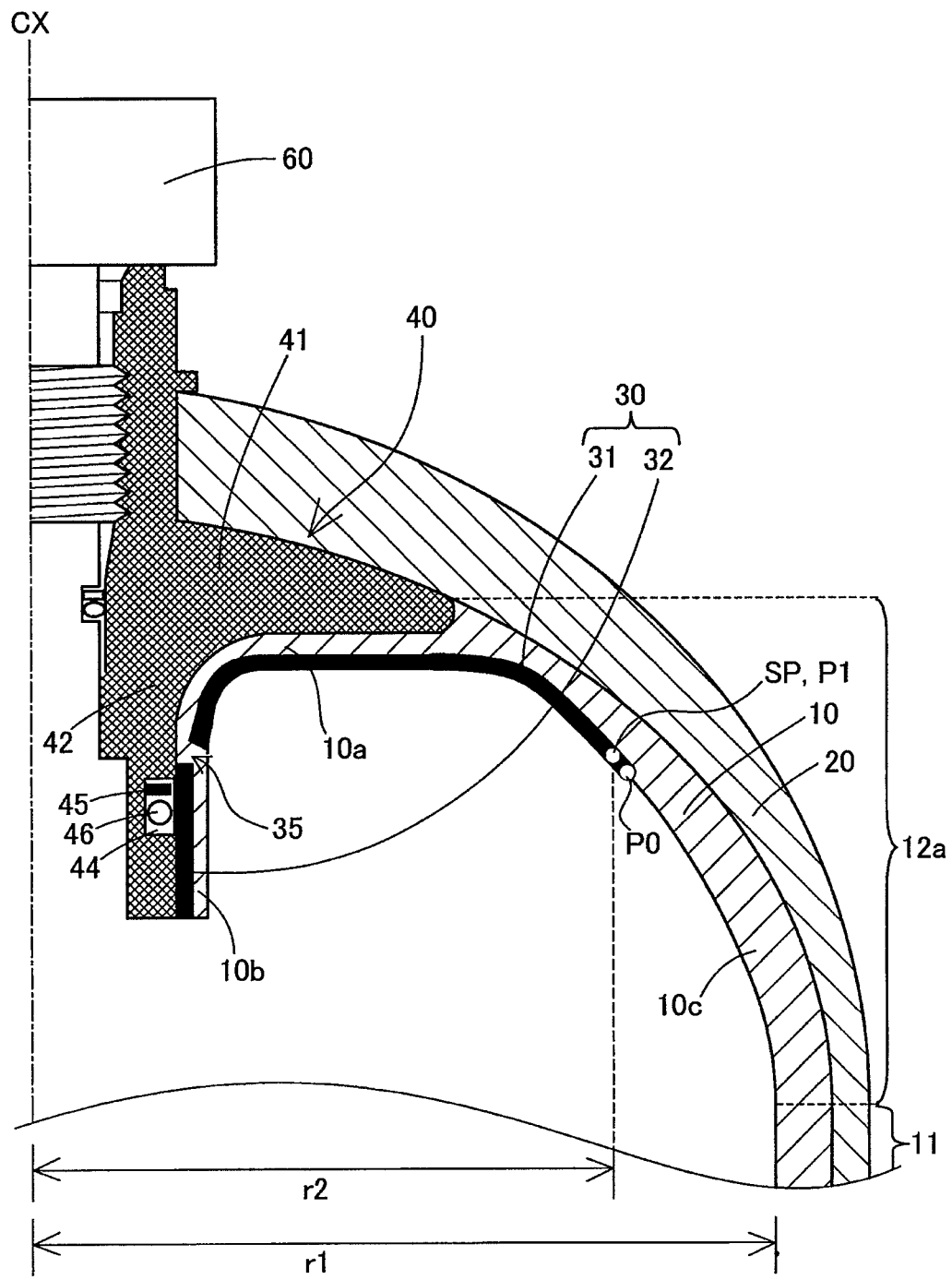
FIG. 4 is a schematic enlarged cross-sectional view of a collet ring and its vicinity.

FIG. 4 is a schematic enlarged cross-sectional view of the collet ring 40 and its vicinity. FIG. 4 illustrates the cross section that passes through the through hole 35. As illustrated in FIG. 4, part of the collet ring 40 is in contact with the liner 10 or the reinforcement member 30. Specifically, the outer surface of the flange portion 41 and part of the outer surface of the protrusion portion 42 are in contact with the outer surface of the liner 10. In addition, other part of the outer surface of the protrusion portion 42 is in contact with the second cover portion 32.

The protrusion portion 42 has a storage groove 44. The outer surface of the storage groove 44 is covered with the second cover portion 32. A backup ring 45 and an O-ring 46 are stored in the storage groove 44. The backup ring 45 is a ring-shaped member that has an approximately rectangular cross portion. The backup ring 45 is formed from a hard resin material. The backup ring 45 is arranged in the storage groove 44 outside the O-ring 46 in the axial direction to suppress the movement of the O-ring 46 in the axial direction.

The O-ring 46 is a ring-shaped elastic member that has an approximately circular cross portion. The O-ring 46 is used to enhance the air tightness between the liner 10 and the collet ring 40. When the collet ring 40 is attached (press-fitted) into the liner 10, the O-ring 46 is brought into press-contact with the outer surface of the second cover portion 32 to seal the gap between the outer surface of the protrusion portion 42 and the outer surface of the liner 10, more precisely, the gap between the outer surface of the protrusion portion 42 and the outer surface of the second cover portion 32. The O-ring 46 is formed from a resin such as polytetrafluoroethylene (PTFE), for example.

As illustrated in FIG. 4, the first cover portion 31 is continuously arranged on the liner 10 from part of the dome portion 12a to part of the protrusion portion 42 of the collet ring 40. Specifically, the first cover portion 31 is arranged on the inner surface of the liner 10 in a range from a point P0 on the dome portion 12a to the protrusion portion 42. This range includes a shoulder portion SP. Therefore, the first cover portion 31 is arranged continuously from the shoulder portion SP to the portion covering the protrusion portion 42. The shoulder portion SP is an annular region with a set of points that are located on the inner surface of the dome portion 12a near the boundary between the trunk portion 11 and the dome portion 12a at a distance r2 from the central axis CX of the liner 10. In the present embodiment, the distance r2 is equal to the radius r1 of the trunk portion 11 multiplied by 0.9. In the cross-sectional view of FIG. 4, the shoulder portion SP is indicated as point P1. For the sake of convenience, FIG. 4 illustrates the point P0 and the point P1 as white points.

As the result of a study, the inventor of the subject invention has found that covering at least the shoulder portion SP would make it possible to, with decrease in the internal pressure of the tank 100, suppress the shrinkage of the liner 10 and reduce the amount of a gap between the liner 10 and the fiber-reinforced resin layer 20 in a region from the boundary between the trunk portion 11 and the dome portion 12a to the dome portion 12a. Suppressing the shrinkage (deformation) of the liner 10 at the shoulder portion SP in the radial direction of the liner 10 makes it possible to suppress the shrinkage of the shoulder portion SP in the direction toward the center of the internal space of the liner 10. Accordingly, it is estimated that this suppresses the shrinkage (deformation) of a portion of the liner 10 nearer the end side in the axial direction (the apex side of the dome portion 12a) than a region from the boundary between the trunk portion 11 and the dome portion 12a to the dome portion 12a, toward the trunk portion 11 side (axial direction).

As illustrated in FIG. 4, a portion of the liner 10 sandwiched between the first cover portion 31 and the flange portion 41 of the collet ring 40 (hereinafter, called "first contact portion 10a") is in contact with the outer surface of the first cover portion 31.

The second cover portion 32 is arranged on a portion of the liner 10 that covers the outer surface of the protrusion portion 42 of the collet ring 40. Specifically, the second cover portion 32 covers the outer surface of the protrusion portion 42 continuously from the position more outward in the axial direction than the end of the storage groove 44 on the flange portion 41 side to the terminal end of the protrusion portion 42. As illustrated in FIG. 4, a portion of the liner 10 in contact with the second cover portion 32 in the radial direction (hereinafter, called "second contact portion 10b") is in contact with the outer surface of the second cover portion 32.

As illustrated in FIG. 4, the reinforcement member 30 is not arranged at a portion of the dome portion 12a from the point P0 to the boundary with the trunk portion 11 (hereinafter, called "non-contact portion 10c") and the trunk portion 11. That is, the trunk portion 11 is not in contact with the reinforcement member 30, and the inner surface of the trunk portion 11 is not covered with the reinforcement member 30.

As illustrated in FIGS. 2, 3, and 4, the reinforcement member 30 has the through holes 35 in the thickness direction between the first cover portion 31 and the second cover portion 32. The through holes 35 are used such that a resin flows between the first contact portion 10a and the second contact portion 10b at the time of formation of the liner 10.

Figure 5:
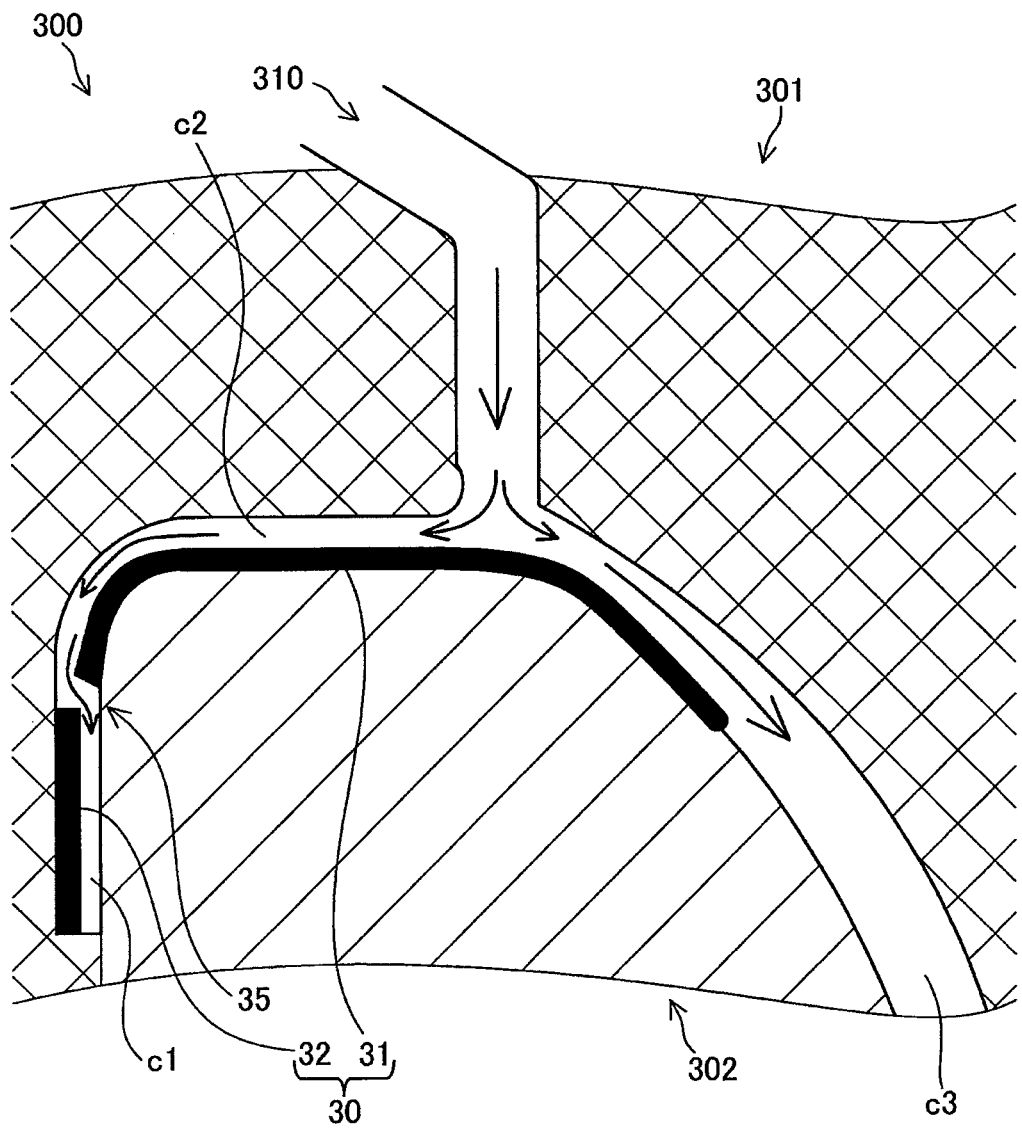
FIG. 5 is a diagram describing integral molding of a liner and the reinforcement member.

A3. Method for Manufacturing the Liner:

FIG. 5 is a diagram describing integral molding of the liner 10 and the reinforcement member 30. As illustrated in FIG. 5, a resin molding die 300 is used for integral molding of the liner 10 and the reinforcement member 30. FIG. 5 illustrates a portion of the resin molding die 300 corresponding to the collet ring 40 and its vicinity illustrated in FIG. 4 in an enlarged view. As illustrated in FIG. 5, the resin molding die 300 includes an upper die 301 and a lower die 302. The upper die 301 is formed in the shape corresponding to the inner surface of the collet ring 40 and the outer surface of the dome portion 12a of the liner 10. The lower die 302 is formed in the shape corresponding to the inner surface of the liner 10. The upper die 301 includes a resin inlet 310. A heated and molten resin material is injected through the resin inlet 310. FIG. 5 schematically illustrates the flow of the resin material from the resin inlet 310 by arrows.

The liner 10 is formed according to the following procedure. The reinforcement member 30 is arranged in the lower die 302, and the upper die 301 is placed on the lower die 302 such that the end surface of the upper die 301 is in contact with the end surface of the lower die 302 except for the resin inlet 310, and then the dies are clamped under a predetermined clamping pressure. At this time, air gaps c1, c2, and c3 are defined in the resin molding die 300. The air gap c1 is approximately identical in shape to the second contact portion 10b. The air gap c2 is approximately identical in shape to the first contact portion 10a, and the air gap c3 is approximately identical in shape to the non-contact portion 10c.

The resin material flows from the resin inlet 310 into the air gaps c1, c2, and c3. At this time, the resin material flowing from the resin inlet 310 is divided into two parts at the exit of the resin inlet 310 as illustrated with arrows in FIG. 5. One part passes through the air gap c2 and flows into the air gap c1 via the through hole 35. The other part flows into the air gap c3. After that, the resin material in the air gaps c1, c2, and c3 is heated and hardened to form the liner 10.

According to the tank 100 of the present embodiment described above, the reinforcement member 30 is arranged at least at the shoulder portion SP in the dome portion 12a near the boundary between the dome portion 12a and the trunk portion 11. Accordingly, the reinforcement member 30 can suppress the shrinkage of the liner 10 at the shoulder portion SP at the time of shrinkage of the tank 100, which makes it possible to reduce the amount of a gap between the liner 10 and the fiber-reinforced resin layer 20 as compared to the configuration without the reinforcement member 30. In addition, the reinforcement member 30 is not arranged at least at part of the trunk portion 11, which enables weight reduction of the tank 100 as compared to the configuration in which the reinforcement member 30 is arranged at the entire trunk portion 11.

In addition, the reinforcement member 30 can be arranged in the region from the boundary between the trunk portion 11 and the dome portion 12a where a gap between the liner 10 and the fiber-reinforced resin layer 20 is likely to remain to the dome portion 12a, which makes it possible to reduce the amount of a gap between the liner 10 and the fiber-reinforced resin layer 20 in the region. The reinforcement member 30 is in contact with at least part of the outer surface of the protrusion portion 42, which makes it possible to release the heat of the tank 100 from the reinforcement member 30 to the outside of the tank 100 through the protrusion portion 42 and conduct the heat of the outside into the tank 100 from the protrusion portion 42 through the reinforcement member 30, thereby adjusting the temperature of the tank 100 appropriately. The reinforcement member 30 has the through holes 35 that penetrate in the thickness direction such that a resin flows between the first contact portion 10a and the second contact portion 10b, which makes it possible that a resin flows through the through holes 35 at the time of integral molding of the reinforcement member 30 and the liner 10. Accordingly, it is possible to suppress the occurrence of a portion without the resin.

B. Examples

Figure 6:
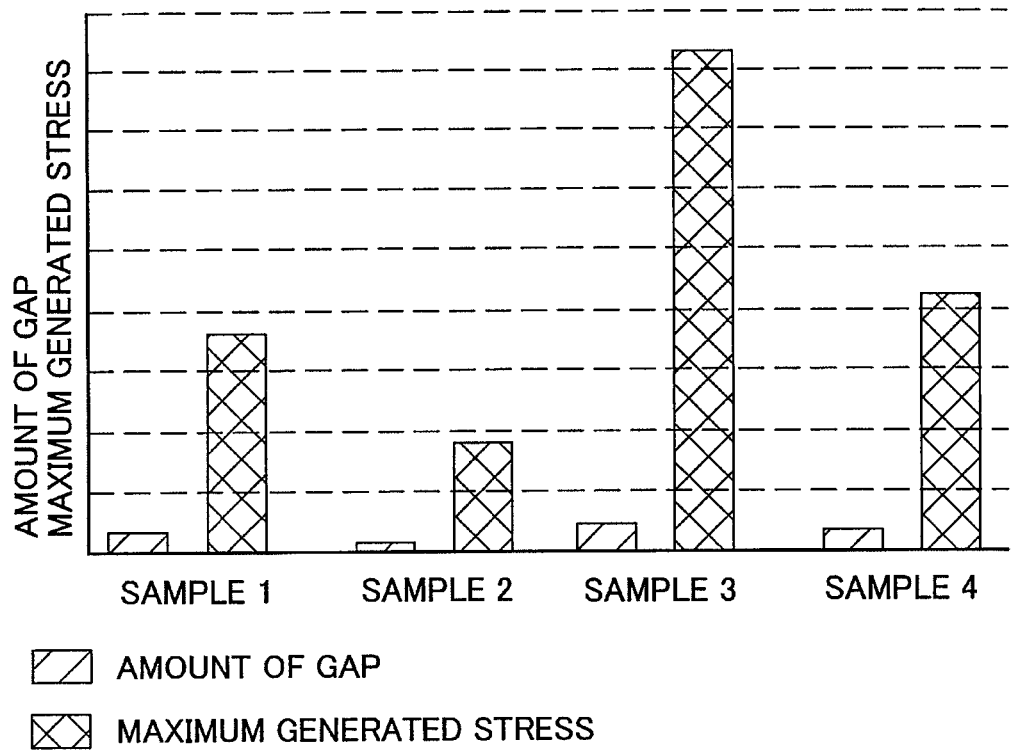
FIG. 6 is a diagram describing an advantageous effect of the tank in a first embodiment.

FIG. 6 is a diagram describing performance of the tank 100 in the first embodiment. Based on the first embodiment described above, the tanks 100 (samples 1 to 4) were manufactured. For each of the samples 1 to 4, the amount of a gap between the liner 10 and the fiber-reinforced resin layer 20 at the boundary between the trunk portion 11 and the dome portion 12a in the axial direction and the maximum generated stress applied to the liner 10 were calculated by simulation based on computer aided engineering (CAE). The CAE simulation was conducted by using the linear expansion coefficient, Young's modulus, and density of the liner 10 as parameters, for example. Specifically, the linear expansion coefficient of the liner 10 was 1.1 E-4, the Young's modulus of the liner 10 was 2.6 GPa, and the density of the liner 10 was 1.07 G/cm3.

FIG. 6 indicates the samples in the lateral axis and the amount of a gap and the maximum generated stress in the vertical axis. The "maximum generated stress" refers to the maximum stress applied to the liner 10 when a fuel gas is charged into the tank 100 in the low-temperature and low-pressure state, for example, the state in which the tank 100 has emitted almost all the fuel gas. The tanks 100 of samples 1 to 4 are different in temperature and internal pressure. Specifically, the sample 1 and the sample 2 are equal in temperature and different in internal pressure. The internal pressure in the sample 1 is lower than the internal pressure in the sample 2. The sample 3 and the sample 4 are equal in temperature and different in internal pressure. The temperature of the sample 3 and the sample 4 is lower than the temperature of the sample 1 and the sample 2. The internal pressure in the sample 3 is equal to the internal pressure in the sample 1, and the internal pressure in the sample 4 is equal to the internal pressure in the sample 2.

As can be understood from comparisons between the sample 1 and the sample 2 and between the sample 3 and the sample 4, when the temperatures of the tanks 100 are the same, the sample with a higher internal pressure in the tank 100 is lower in the amount of a gap and the maximum generated stress than the sample with a lower internal pressure in the tank 100. In addition, as can be understood from comparison between the sample 1 and the sample 3 and between the sample 2 and the sample 4, when the internal pressures in the tanks 100 are the same, the sample with a higher temperature of the tank 100 is lower in the amount of a gap and the maximum generated stress than the sample with a lower temperature of the tank 100. When the internal pressures in the tanks 100 are the same, the maximum generated stress was more suppressed in the sample with a higher temperature in the tank 100.

Figure 7:
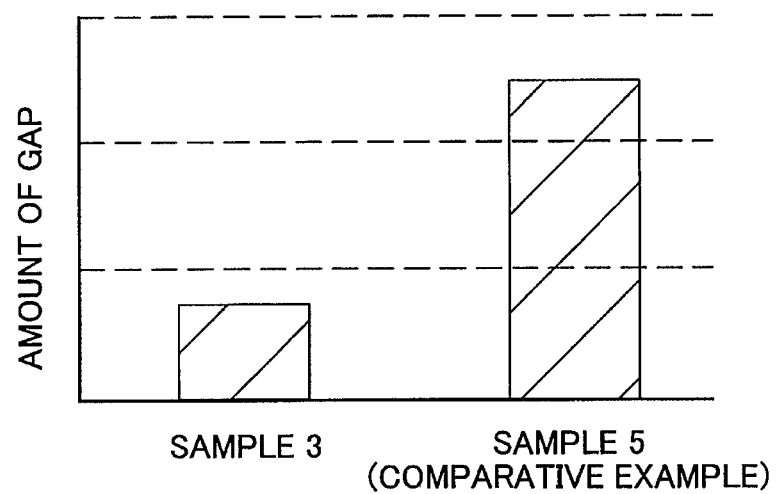
FIG. 7 is a diagram describing another advantageous effect of the tank in the first embodiment.

FIG. 7 is a diagram describing other performance of the tank 100 in the first embodiment. The foregoing tank 100 (the sample 3) was manufactured. In addition, a tank (the sample 5) without the reinforcement member 30 was manufactured as a comparative example. For these tanks, the amount of a gap between the liner 10 and the fiber-reinforced resin layer 20 at the boundary between the trunk portion 11 and the dome portion 12a in the axial direction was calculated by the CAE simulation described above. FIG. 7 indicates the samples in the lateral axis and the amount of a gap in the vertical axis.

As illustrated in FIG. 7, the sample 3 has a smaller amount of a gap than that in the sample 5 as a comparative example. This is possibly because the reinforcement member 30 was arranged on the inner surface of the liner 10 of the sample 3 so that, when the inner pressure was lowered and the tank shrank, the reinforcement member 30 suppressed the dimensional changes in the liner 10 in the axial direction and the radial direction to reduce the amount of shrinkage of the liner 10.

C. Second Embodiment

FIG. 8 is a cross-sectional view of a schematic configuration of a tank 100a in a second embodiment. FIG. 8 illustrates the collet ring 40 and its vicinity of the tank 100a as FIG. 4 does. The tank 100a in the second embodiment is different from the tank 100 in the first embodiment in including a reinforcement member 30a instead of the reinforcement member 30. Other components of the tank 100a in the second embodiment are the same as those of the tank 100 in the first embodiment, and thus the same components will be given as the same reference signs as those of the first embodiment and detailed descriptions thereof will be omitted.

The reinforcement member 30a in the second embodiment is different in arrangement position from the reinforcement member 30 in the first embodiment. Specifically, as illustrated in FIG. 8, the reinforcement member 30a includes a first member 33 and a second member 34. The first member 33 and the second member 34 are formed as separate members, and there is no large hole between the first member 33 and the second member 34. The first member 33 has an approximately cylindrical outer shape. The first member 33 is arranged on the liner 10 at a portion covering part of the outer surface of the protrusion portion 42 of the collet ring 40, as with the second cover portion 32 described above. Specifically, the first member 33 covers continuously from a position in the storage groove 44 more outward in the axial direction than the end on the flange portion 41 side to the terminal end of the protrusion portion 42. The second member 34 has an approximately donut-like outer shape. The second member 34 covers the inner surface of the liner 10 continuously from the point P1 on the dome portion 12a, that is, the shoulder portion SP as an end, to the boundary between the dome portion 12a and the trunk portion 11, and the trunk portion 11 near the boundary. That is, the reinforcement member 30a is not arranged on the entire trunk portion 11.

The tank 100a in the second embodiment described above can provide the same advantageous effects as those of the first embodiment. In addition, the reinforcement member 30a covers continuously from the shoulder portion SP as an end to part of the inner surface of the trunk portion 11, which makes it possible to reduce the size of the reinforcement member 30 and reduce the weight of the tank 100 as compared to the configuration in which the reinforcement member 30a covers continuously from the protrusion portion 42 to part of the inner surface of the trunk portion 11.

D. Other Embodiments

D1. Other Embodiment 1

In the foregoing embodiments, the reinforcement member 30 or 30a is arranged on the liner 10 in a predetermined region including the point P1 on the inner surface of the dome portion 12a, but the present disclosure is not limited to this. For example, the reinforcement member 30 or 30a may be in contact with only the point P1. In this configuration, an annular metallic wire may be arranged in contact with an annular region as a set of points at which the distance r2 from the point P1 on the inner surface of the liner 10, that is, the central axis CX of the liner 10 is equal to the radius r1 of the trunk portion 11 multiplied by 0.9. Alternatively, for example, the reinforcement member 30 or 30a may be in contact with a point on the outer surface of the liner 10 at which the distance r2 from the central axis CX of the liner 10 is equal to the radius r1 of the trunk portion 11 multiplied by 0.9. Still alternatively, for example, the reinforcement member 30 or 30a may be in contact with a point on the liner 10 at which the distance r2 from the central axis CX of the liner 10 is equal to the radius r1 of the trunk portion 11 multiplied by 0.9, except for points on the inner surface and points on the outer surface of the liner 10. These configurations can provide the same advantageous effects as those of the foregoing embodiments.

D2. Other Embodiment 2

In the foregoing embodiments, the distance r2 from the central axis CX of the liner 10 to the shoulder portion SP is equal to the radius r1 of the trunk portion 11 multiplied by 0.9, but the present disclosure is not limited to this. For example, the distance r2 may be a distance within a predetermined range centered on the radius r1 of the trunk portion 11 multiplied by 0.9. Specifically, the distance r2 may be an arbitrary distance within a range from the radius r1 of the trunk portion 11 multiplied by 0.85 to the radius r1 of the trunk portion 11 multiplied by 0.95. These configurations can provide the same advantageous effects as those of the foregoing embodiments.

D3. Other Embodiment 3

In the foregoing embodiments, the reinforcement member 30 or 30a is arranged on the liner 10 at the dome portion 12a on the side to which the collet ring 40 is attached, but the present disclosure is not limited to this. For example, the reinforcement member 30 or 30a may be arranged on the liner 10 at the dome portion 12b on the side to which the end boss 50 is attached. Alternatively, the reinforcement member 30 or 30a may be arranged on both the dome portions 12a and 12b. These configurations can provide the same advantageous effects as those of the foregoing embodiments.

D4. Other Embodiment 4

In the first embodiment, the reinforcement member 30 includes the through holes 35. Instead of the through holes, the reinforcement member 30 may include cutouts. The reinforcement member 30 may not include the through holes 35. In this configuration as well, the reinforcement member 30 is arranged on the liner 10 continuously from the shoulder portion SP to the portion covering the protrusion portion 42 and the portion covering the protrusion portion 42, which provides the same advantageous effects as those of the first embodiment.

D5. Other Embodiment 5

In the second embodiment, the reinforcement member 30a includes the first member 33. Instead of the first member 33, the reinforcement member 30a may include another approximately cylindrical metallic member not molded integrally with the liner 10. This configuration can provide the same advantageous effects as those of the second embodiment.

D6. Other Embodiment 6

In the foregoing embodiments, the tank 100 or 100a is a tank for storage of a high-pressure fluid, but the present disclosure is not limited to this. The tank 100 or 100a may be a tank for use in any other application. This configuration can provide the same advantageous effects as those of the foregoing embodiments.

The present disclosure is not limited to the foregoing embodiments but can be implemented in various manners without deviating from the gist of the present disclosure. For example, the technical features of the embodiments may be replaced or combined appropriately, in order to solve part or all of the problems described above or in order to achieve part or all of the advantageous effects described above. Any of the technical features may be omitted appropriately unless the technical feature is described as essential in the description hereof. For example, the present disclosure can be implemented as the following aspects.

(1) According to an aspect of the present disclosure, a tank is provided. This tank comprises: a liner having a cylindrical trunk portion and a hemispherical dome portion provided at both ends of the trunk portion in a central axis direction; a fiber-reinforced resin layer formed on an outer peripheral surface of the liner; and a metallic reinforcement member formed integrally with the liner. The reinforcement member is arranged in the dome portion at least at a shoulder portion near a boundary between the dome portion and the trunk portion and is not arranged at least at part of the trunk portion.

According to the tank in this aspect, the reinforcement member is arranged in the dome portion at least at the shoulder portion near the boundary between the dome portion and the trunk portion, and thus the reinforcement member suppresses the shrinkage of the liner at the shoulder portion even when the tank shrinks. This makes it possible to reduce the amount of a gap between the liner and the fiber-reinforced resin layer as compared to the configuration without the reinforcement member. In addition, the reinforcement member is not arranged at least at part of the trunk portion, which makes it possible to achieve the weight reduction of the tank as compared to the configuration in which the reinforcement member is arranged on the entire trunk portion.

(2) According to another aspect, a distance from the central axis of the liner to the shoulder portion may be equal to a radius of an inner surface of the trunk portion multiplied by 0.9.

According to the tank in this aspect, the distance from the central axis of the liner to the shoulder portion is equal to the radius of an inner surface of the trunk portion multiplied by 0.9, and thus the reinforcement member can be arranged in a region from the boundary between the trunk portion and the dome portion to the dome portion where the gap between the liner and the fiber-reinforced resin layer is likely to remain. Accordingly, in this region, the amount of the gap between the liner and the fiber-reinforced resin layer can be reduced.

(3) According to another aspect, may further comprise a collet ring that is installed at a top of the dome portion for attachment of a valve and has a protrusion portion protruding in the axial direction from the dome portion toward the trunk portion. The liner may cover an outer surface of the protrusion portion. The reinforcement member may be arranged on the liner continuously from the shoulder portion to a portion covering the protrusion portion and the portion covering the protrusion portion.

According to the tank in this aspect, the reinforcement member is arranged on the liner continuously from the shoulder portion to the portion covering the protrusion portion and the portion covering the protrusion portion, which makes it possible to reduce the amount of the gap between the liner and the fiber-reinforced resin layer in a region continuous from the shoulder portion to the portion covering the protrusion portion and the portion covering the protrusion portion.

(4) According to another aspect, the reinforcement member may be in contact with at least part of the outer surface of the protrusion portion.

According to the tank in this aspect, the reinforcement member is in contact with at least part of the outer surface of the protrusion portion, which makes it possible to release the heat of the tank from the reinforcement member to the outside through the protrusion portion and conduct the heat of the outside into the tank from the protrusion portion through the reinforcement member, thereby adjusting the temperature of the tank appropriately.

(5) According to another aspect, the liner may be formed from a resin and have: a first contact portion that is in contact with an outer surface of a first cover portion of the reinforcement member arranged on the liner from the shoulder portion to the portion covering the protrusion portion; and a second contact portion that is in contact with an outer surface of a second cover portion of the reinforcement member arranged on the liner at the portion covering the protrusion portion. The reinforcement member may have a through hole that penetrates through the reinforcement member in a thickness direction such that the resin flows between the first contact portion and the second contact portion.

According to the tank in this aspect, the reinforcement member has the through hole that penetrates through the reinforcement member in the thickness direction such that the resin flows between the first contact portion and the second contact portion, accordingly, the resin can flow through the through hole. This makes it possible to form integrally the liner and the reinforcement member and suppress the occurrence of a portion without the resin.

(6) According to another aspect, the reinforcement member may cover continuously from the shoulder portion as an end to part of an inner surface of the trunk portion.

According to the tank in this aspect, the reinforcement member covers continuously from the shoulder portion as an end to part of the inner surface of the trunk portion, which makes it possible to achieve size reduction of the reinforcement member and weight reduction of the tank as compared to the configuration in which the reinforcement member covers continuously from the protrusion portion to part of the inner surface of the trunk portion.

The present disclosure can be implemented in various aspects. For example, the present disclosure can be implemented in aspects such as a method for manufacturing a tank, an apparatus for manufacturing a tank, and a movable body equipped with a tank.

What is claimed is:

1. A tank, comprising:
    a liner having a cylindrical trunk portion and a hemispherical dome portion provided at both ends of the trunk portion in a central axis direction;
    a fiber-reinforced resin layer formed on an outer peripheral surface of the liner;
    a collet ring that is installed at a top of the dome portion for attachment of a valve and has a protrusion portion protruding in the axial direction from the dome portion toward the trunk portion; and
    a metallic reinforcement member separate from the collet ring and integrally molded with the liner on an inside surface of the liner and contained completely within an internal space defined by the liner, wherein
    the reinforcement member is arranged in the dome portion at least at a shoulder portion near a boundary between the dome portion and the trunk portion and is not arranged at least at part of the trunk portion.

2. The tank in accordance with claim 1,
    wherein a distance from the central axis of the liner to the shoulder portion is equal to a radius of an inner surface of the trunk portion multiplied by 0.9.

3. The tank in accordance with claim 2,
    wherein
    the liner covers an outer surface of the protrusion portion, and
    the reinforcement member is arranged on the liner continuously from the shoulder portion to a portion covering the protrusion portion and the portion covering the protrusion portion.

4. The tank in accordance with claim 3,
    wherein the reinforcement member is in contact with at least part of the outer surface of the protrusion portion.

5. The tank in accordance with claim 4, wherein
    the liner is formed from a resin,
    the liner has:
    a first contact portion that is in contact with an outer surface of a first cover portion of the reinforcement member arranged on the liner from the shoulder portion to the portion covering the protrusion portion; and
    a second contact portion that is in contact with an outer surface of a second cover portion of the reinforcement member arranged on the liner at the portion covering the protrusion portion, and
    the reinforcement member has a through hole that penetrates through the reinforcement member in a thickness direction such that the resin flows between the first contact portion and the second contact portion.

6. The tank in accordance with claim 3, wherein
    the liner is formed from a resin,
    the liner has:
    a first contact portion that is in contact with an outer surface of a first cover portion of the reinforcement member arranged on the liner from the shoulder portion to the portion covering the protrusion portion; and
    a second contact portion that is in contact with an outer surface of a second cover portion of the reinforcement member arranged on the liner at the portion covering the protrusion portion, and
    the reinforcement member has a through hole that penetrates through the reinforcement member in a thickness direction such that the resin flows between the first contact portion and the second contact portion.

7. The tank in accordance with claim 1,
    wherein
    the liner covers an outer surface of the protrusion portion, and
    the reinforcement member is arranged on the liner continuously from the shoulder portion to a portion covering the protrusion portion and the portion covering the protrusion portion.

8. The tank in accordance with claim 7, wherein the reinforcement member is in contact with at least part of the outer surface of the protrusion portion.

9. The tank in accordance with claim 8, wherein
the liner is formed from a resin,
the liner has:
a first contact portion that is in contact with an outer surface of a first cover portion of the reinforcement member arranged on the liner from the shoulder portion to the portion covering the protrusion portion; and
a second contact portion that is in contact with an outer surface of a second cover portion of the reinforcement member arranged on the liner at the portion covering the protrusion portion, and
the reinforcement member has a through hole that penetrates through the reinforcement member in a thickness direction such that the resin flows between the first contact portion and the second contact portion.

10. The tank in accordance with claim 7, wherein
the liner is formed from a resin,
the liner has:
a first contact portion that is in contact with an outer surface of a first cover portion of the reinforcement member arranged on the liner from the shoulder portion to the portion covering the protrusion portion; and
a second contact portion that is in contact with an outer surface of a second cover portion of the reinforcement member arranged on the liner at the portion covering the protrusion portion, and
the reinforcement member has a through hole that penetrates through the reinforcement member in a thickness direction such that the resin flows between the first contact portion and the second contact portion.

11. The tank in accordance with claim 1, wherein the reinforcement member covers continuously from the shoulder portion as an end to part of an inner surface of the trunk portion.

12. A tank, comprising:

a liner having a cylindrical trunk portion and a hemispherical dome portion provided at both ends of the trunk portion in a central axis direction;

a fiber-reinforced resin layer formed on an outer peripheral surface of the liner;

a collet ring that is installed at a top of the dome portion for attachment of a valve and has a protrusion portion protruding in the axial direction from the dome portion toward the trunk portion; and a metallic reinforcement member separate from the collet ring and integrally molded with the liner, wherein the reinforcement member is arranged in the dome portion at least at a shoulder portion near a boundary between the dome portion and the trunk portion and is not arranged at least at part of the trunk portion.

* * * * *